(12) United States Patent
Ogawa et al.

(10) Patent No.: US 6,316,088 B1
(45) Date of Patent: Nov. 13, 2001

(54) HOT-MELT ADHESIVE POWDER DISPERSED IN WATER WITH ALKALI THICKENER

(75) Inventors: Masanori Ogawa; Norihiko Kioka; Kuninori Ito, all of Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 0 days.

(21) Appl. No.: 09/694,414

(22) Filed: Oct. 23, 2000

(30) Foreign Application Priority Data

Feb. 26, 1999 (JP) .................................................. 11-50115
May 7, 1999 (JP) ................................................ 11-126594

(51) Int. Cl.[7] .................................................. B32B 27/04
(52) U.S. Cl. .................. 428/297.4; 428/200; 428/300.7; 428/301.4
(58) Field of Search .................................. 428/200, 423.1, 428/246, 423.3, 297.4, 300.7, 301.4; 525/183, 173

(56) References Cited

U.S. PATENT DOCUMENTS

4,307,004 * 12/1981 Schuhmacher et al. ...... 200/29.2 TN
5,352,741 * 10/1994 Diericky et al. ..................... 525/183

* cited by examiner

*Primary Examiner*—Merrick Dixon
(74) *Attorney, Agent, or Firm*—Cooper & Dunham LLP; Donald S. Dowden

(57) ABSTRACT

A hot-melt adhesive powder is dispersed in water. An alkali-thickening type acrylic emulsion or a slightly cross-linked polyacrylic acid is used as a thickener. The dispersion provides a product having a uniform quality.

14 Claims, 3 Drawing Sheets

HOT-MELT ADHESIVE POWDER DISPERSED IN WATER WITH ALKALI THICKENER

FIELD OF THE INVENTION

The present invention relates to a dispersion of a hot-melt sheet powder used for coating a hot-melt adhesive powder on a sheet such as a cloth, a non-woven fabric, and the like and said sheet may be used as a heat sensitive adhesive sheet, a thermoformable fiber sheet, and used in an interior and a carpet.

BACKGROUND OF THE INVENTION

To give a heat sensitive adhesion property, a hot-melt adhesive powder is coated on a sheet such as a cloth, a non-woven fabric and the like. Hitherto, to coat said hot-melt adhesive powder on said sheet, a method A wherein an aqueous dispersion in which the hot-melt adhesive powder is dispersed is coated on the sheet by using a mesh roller, a method B wherein said hot-melt adhesive powder is strewed on the sheet, and the like have been provided.

Nevertheless, the method A has a disadvantage that said mesh roller is apt to be clogg by the nap of the cloth or the non-woven fabric and the method B has a disadvantage that it is difficult to hold said hot melt adhesive powder on the surface of the cloth or the non-woven fabric since a considerable amount of said hot-melt adhesive powder enters into the space between the naps of the cloth or the non-woven fabric resulting in a poor heat sensitive adhesion.

To solve the above described disadvantages, a dispersion in which a hot-melt adhesive powder is dispersed in the water the viscosity of which is increased by adding a thickener has been provided. Said dispersion has a structural viscosity such that said dispersion may not enter into the space between the naps to be held on the surface of the cloth or the non-woven fabric and said hot melt adhesive powder is effectively fixed on the surface of the cloth or the non-woven fabric.

DISCLOSURE OF THE INVENTION

Hitherto, polysodiumacrylate has been used for a thickener of said dispersion of said hot-melt adhesive powder. Nevertheless, since polysodiumacrylate has a big moisture absorption property and when polysodiumacrylate is dissolved in the water, clod is apt to be produced and as a result, a long time is necessary to dissolve polysodium acrylate in the water. Further, the dispersion in which polysodiumacrylate is used for thickening does not show the plastic flow and cannot prevent the sedimentation of said hot-melt adhesive powder completely, so the stirring of said dispersion is necessary. If the stirring is not enough, the coating of said hot-melt powder on the sheet may be uneven.

Accordingly, the object of the present invention is to provide the dispersion of a hot-melt adhesive powder in which the sedimentation of said hot-melt adhesive powder is effectively prevented and the product having an uniform quality by using said dispersion.

To attain the above described object, the present invention provides a dispersion of a hot-melt adhesive powder consisting of the water and a hot-melt adhesive powder which is dispersed in said water wherein an alkali-thickening type thickener is used for thickening of said dispersion. It is desirable to select an alkali-thickening type acrylic emulsion and/or a slightly cross-linked polyacrylic emulsion. Herein "slightly cross linked" means "cross linked in low density so as to maintain water soluble property".

A desirable method to prepare said dispersion is the method in which a hot-melt adhesive powder is dispersed and said alkali-thickening type thickener is added in the water and then an alkali agent is added for thickening or an alkali-thickening type thickener is added in the water and then an alkali agent is added for thickening followed by dispersing a hot-melt adhesive powder but the method in which a hot-melt adhesive is dispersed and an alkali agents added in the water and then an alkali-thickening type thickener is added for thickening may be applicable.

Said dispersion of a hot-melt adhesive powder using an alkali-thickening type thickener shows plastic flow to prevent substantially the sedimentation of the hot-melt adhesive powder, stirring said dispersion is not always necessary.

Further, when said alkali-thickening type thickener is added in water before adding an alkali agent, the viscosity of the water may not be remarkably increased such that said alkali-thickening type thickener can be dissolved uniformly in the water. Especially, when an acrylic emulsion as an alkali-thickening type thickener is used, said acrylic emulsion is very easy to disperse in the water and when a slightly cross-linked polyacrylic acid is used, said slightly cross-linked polyacrylic acid can be dispersed and dissolved uniformly in the water without producing clod.

The product using said dispersion of a hot-melt adhesive powder such as a heat sensitive adhesive sheet, a thermoformable fiber sheet, and a carpet, and further an interior or a molded fiber sheet using said sheet have an uniform quality since a hot-melt adhesive powder is uniformly coated on said sheet when said dispersion of a hot-melt adhesive powder is sprayed to said sheet.

Accordingly, the present invention further provides a heat sensitive adhesive sheet manufactured by the process consisting of spraying said dispersion on a base sheet and drying, and a synthetic resin may be impregnated in said sheet. When said base sheet has gas permeability, said dispersion is preferably coated by spraying on one side of said base sheet by forming a vacuum on the other side of said base sheet.

The present invention further provides an interior using said heat sensitive adhesive sheet as a surface layer by attaching it on a base of the interior, a thermoformable fiber sheet manufactured by the process consisting of spraying said dispersion to fiber and forming a sheet by using said fiber and a carpet having dotted backing layer on its backside manufactured by the process consisting of spraying said dispersion on the backside of said carpet and drying.

DETAILED DESCRIPTION

In the present invention, as hot-melt adhesive, polyoelfin type resin such as polyethylene, polypropylene, ethylene-vinyl acetate copolymer, ethylene-ethyl acrylate copolymer and the like,modified polyolefin type resin, polyvinyl chloride, polyurethane, polyester, polyester copolymer, polyamide, polyamide copolymer and the like may be used singly or as a mixture of two or more kinds. The particle size of said hot-melt adhesive is usually in the range between 50 to 300 mesh.

A thickener used in the present invention is an alkali-thickening type thickener. A desirable alkali-thickening type thickener is an alkali-thickening type acrylic emulsion and the other desirable alkali-thickening type thickener is a slightly cross-linked polyacrylic acid.

Said alkali-thickening type acrylic emulsion may include a copolymer of acrylic ester and $\alpha, \beta$-unsaturated carboxylic acid, a copolymer of acrylic ester, another vinyl monomer(s)

which can be copolymerized with said acrylic ester, and α, β-unsaturated carboxylic acid.

As said acrylate, methyl acrylate, ethyl acrylate, n-propyl acrylate, isopropyl acrylate, n-butyl acrylate, isobutyl acrylate, t-butyl acrylate, 2-ethylhexyl acrylate, cyclohexyl acrylate, tetrahydrofurfuryl acrylate, methyl methacrylate, ethyl methacrylate, n-propyl methacrylate, isopropyl methacrylate, n-butyl methacrylate, isobutyl methacrylate, 2-ethylhexyl methacrylate, cyclohexyl methacrylate, tetrahydrofurfuryl methacrylate, stearyl methacrylate, lauryl methacrylate, β-hydroxyethyl acrylate, β-hydroxyethyl methacrylate, β-hydroxypropyl acrylate, β-hydroxypropyl methacrylate, dimethylaminoethyl acrylate, dimethylaminoethyl methacrylate, glycidyl acrylate, glycidyl methacrylate and the like may be used.

As said α, β-unsaturated carboxylic acid such as acrylic acid, methacrylic acid, maleic acid, itaconic acid, crotonic acid, atropic acid, citraconic acid and the like may be used.

As a vinyl monomer which can copolymerize with said acrylates, a vinyl ether monomer such as methylvinyl ether, ethylvinyl ether, n-propylvinyl ether, n-butylvinyl ether, isobutylvinyl ether and the like, styrene and styrene derivative(α-methlystyrene and the like), a vinyl monomer having a cyano group such as acrylonitrile methacrylonitrile and the like, a vinyl monomer having a isocyanate group such as acryloilisocyanate, methacryloilisocyanate, m-isopropenyl- α, α-dimethlybenzylisocyanate and the like, a vinyl monomer having a amide group such as diacetoneacrylamide, N-vinylformamide, N-vinylacetoamide and the like, a vinyl monomer having a sulfonic acid group such as p-styrene sulfonic acid, 2-(acryloilamino)-2-methylpropane sulfonic acid and the like, a vinyl monomer having a mercapto group such as mercaptopropyltrimethoxysilane, mercaptpropyltriethoxysilane and the like are used.

In said acrylic emulsion, said α, β-unsaturated carboxylic acid may by copolymerized in an enough amount to give a water soluble copolymer when said copolymer is neutralized by an alkali agent. Said amount of said α, β-unsaturated carboxylic acid may be changed by the kinds of acrylic ester, another vinyl monomer, and said α, β-unsaturated carboxylic acid but usually said α, β-unsaturated carboxylic acid is contained in said copolymer at an amount in the range between 20 to 60% by weight, desirably 30 to 50% by weight.

Said acrylic copolymer may be crosslinked with one another if they can be soluble in water. In this case, said copolymer has some multifunctional vinyl monomer such as divinyl benzene, methylene bisacrylamide, ethylene glycol dimethacrylate,polyethylene glycol dimethacrylate, trimethylol propane dimetacrylate, trimethylol propanemetacrylate, diallyl phtalate and the like.

To prepare a dispersion of a hot-melt adhesive powder using said alkali-thickening type acrylic emulsion as a thickener, first said acrylic emulsion and a hot-melt adhesive powder are added to water to make a dispersion by stirring. At this stage, it is very easy to make an uniform dispersion since the viscosity of said dispersion is not yet increased.

Said hot-melt adhesive powder is not always added in the water at the same time of said acrylic emulsion and may be added in the water at any stage but preferably added in the water before thickening.

Said hot-melt adhesive powder is usually dispersed in water in the dange of 1 to 60% by weight of said hot-melt adhesive powder. Said acrylic copolymer is added to said water in order to adjust a viscosity of a dispersion of the hot-melt adhesive powder thickened by alkali in the range of 50 to 2000 cps/° C. For example, in the case of using a emulsion containing 30% by weight of copolymer which is copolymerized of ethylacrylate and methacrylic acid in the weight ratio of 6:4, said emulsion is added to said water in the amount of 0.1 to 10% by weight of said emulsion.

The alkali is added to the water after acrylic copolymer emulsion and the powder of the hot-melt adhesive are added to the water and mixed uniformly. Said copolymer becomes soluble in water because carboxylic acid coming from α, βunsaturated carboxylic acid becomes a salt so that said salt thickens said dispersion.

It may be used for said alkali that ammonia, amine, hydroxide of alkaline metal or alkali earth metal such as sodium hydroxide, potassium hydroxide, barium hydroxide, calsium hydroxide and the like, oxide of alkali earth metal lime such as lime, weak acid salt of alkaline metal such as sodium carbonate, sodium sulfite, sodium acetate, sodium phosphate and the like.

The adding amount of said alkali agent is commonly decided such that pH of said dispersion is adjusted to be in the range between 6 to 9.

As above described, said dispersion of a hot-melt adhesive powder using said alkali-thickening type acrylic emulsion as a thickener shows the plastic flow to prevent the sedimentation of said hot-melt adhesive powder.

On the other hand, said slightly cross-linked polyacrylic acid as a thickener is usually produced by a deposition polymerization method as below described.

In said deposition polymerization, a solvent in which acrylic acid can be dissolved and polyacrylic acid cannot be dissolved is used. Said solvent may be such as benzen, ethylacetate, cyclohexane, toluen and the like or a mixture of two or more solvents above-described and acrylic acid, a cross-linking agent, and an initiator are added in said solvent to polymerize.

As crosslinking agent that multifunctional vinyl monomer such as divinyl benzene, diallyl phtalate, tetraalloxy ethane, ethylene glycol propane dimetacrylate, polyethylene glycol dimetacrylate, trimethylol propane dimetacrylate and the like, sugar derivative such as allylsaccharose and the like may be used. Ordinarily, said crosslinking agent may be added to acrylic acid below 1%, preferably about 0.05% by weight.

As a polymerization initiator, for example, peroxide polymerization initiator such as benzoyl peroxide, methyl ethyl ketone peroxide, cumenehydro peroxide, t-butylhydro peroxide, cyclohexyanone peroxide, t-butyl peroxide, t-butylperoxy benzoate, t-butylperoxy-2-ethylhexanate, t-butylperoxy pivalate, t-butylperoxy neodecanenate, 3,5,5-trimethylhexanoil peroxide, diisopropylbenzene hydro peroxide, lauroyl peroxide, diglyme peroxide, azo polymerization initiator such as 2,2'-azobisisobutyronitrile, 2,2'-azobis-2-methylbuthyronitrile, 2,2'-azobis-2,4'-dimethylvaleronitrile, 2,2'-azobis-2-cycropropylpropionitrile, 2,2'-azobis-4-methoxy-2,4-dimethylvaleronitrile, 1,1'-azobisucyclohexane-1-carbonitrile, 2-phenylazo-4-methoxy-2,4-dimethylvaleronitrile, 2,2'-azobis-N,N'-dimethylfeneisobutiramide and the like, may be used.

When acrylic acid is polymerized in said solvent as above described, a slightly cross-linked polyacrylic acid may deposit and depositing polyacrylic acid powder is collected and dried. The resulting polyacrylic acid is slightly cross-linked in a low density such that said polyacrylic acid maintains water solubility. When the cross-linking density of said polyacrylic acid becomes higher, said polyacrylic acid does not dissolve in the water but swells by adsorbing water and when the cross-linking density of said polyacrylic acid becomes much higher, said polyacrylic acid becomes insoluble in the water.

To prepare said dispersion of a hot-melt adhesive powder, first said slightly cross-linked polyacrylic acid and said hot-melt adhesive powder are added in the water to produce a dispersion by stirring. At this stage, said dispersion has comparatively low viscosity such that said slightly cross-linked polyacrylic acid does not substantially produce clod, and it is easy to make an uniform dispersion.

Further, it is not always necessary that said hot-melt adhesive powder and said slightly cross-linked polyacrylic acid are added together at the same time and said hot-melt adhesive powder may be added at any stage but preferably before thickenening.

Commonly, said hot-melt adhesive powder may be dispersed in the water in an amount in the range between 1 to 60% by weight, and said slightly cross-linked polyacrylic acid may be added such that the viscosity of the resulting dispersion becomes in the range between 50 to 2000 cps at 25° C.

Said slightly cross-linked polyacrylic acid added in the water dissolves in the water to increase slightly the viscosity of the water and when alkali agent is added in said water to neutralize said polyacrylic acid, the viscosity of said water is remarkably increased because the neutralized polyacrylic acid expands its chain by reciprocal electrostatic repelling force of each carbanion.

It is preferable that ammonia, amine such as triethanolamine, diisopropanolamine, aminomethylpropano 1, trimethylol aminomethane, tetrahydroxyethlenediamine and the like may be used as said alkali. Also sodium hydroxide, potassium hydroxide and the like can be used.

Said alkali agent may be added in an amount so as to adjust pH in the range between 6 to 9.

Further a part of a carboxyl group in said slightly cross-linked polyacrylic acid may be neutralized by alkali agent but when said carboxyl group is highly neutralized, clod is apt to be produced so neutralized degree should be settled to be low to avoid producing clod.

Said dispersion of a hot-melt adhesive powder using slightly cross-linked polyacrylic acid as a thickener shows plastic flow to prevent substantially the sedimentation of the hot-melt adhesive powder.

Further said alkali-thickening type acrylic emulsion and said slightly cross-linked polyacrylic acid may be used together in said dispersion of a hot-melt adhesive powder of the present invention.

A surface-active agent such as an anionic sufface-active agent, a nonionic surface-active agent and a cationic surface-active agent may be added to said dispersion of a hot-melt adhesive powder as thickener. As the anionic surface-active agent such as higher alcoholsulfate (Na salt or amine salt), alkylarylsulfona te (Na salt or amine salt), alkylnaphtalenesulufonate (Na salt or amine salt), alkylnaphtalenesulufonate condensation, alkylphosphate, dialkylsulfosuccinate, rosin soap, fatty acid salt (Na salt or amine salt) and the like can be used. As the nonionic surface-active agent such as polyoxyethlyene alkylether, polyoxyethlyene phenolether, polyoxyethlyene alkylester, polyoxyethlyene alkylamine, polyoxyethlyene alkylolamine, polyoxyethlyene alkylamide, sorbitan alkylester, polyoxyethlyene sorbitan alkylester, and the like can be used. As the cationic surface-active agent such as octadecyl amineacetate, imidazolinederivative aceteate, polyalkylene polyamine derivatives or salt thereof, octadecyl trimethyl ammonium chroride, trimethyl aminoethyl alkyltriamide halogenide and the like can be used. Said thickener may be used singly or as a mixture of said surface-active agent.

Further, for example, a thickener having apinnability such as alkaline metal—sodium, potassium, lithium and the like—salt of polyacrylic acid, methacrylic acid, alginic acid and the like, water-soluble synthetic polymer such as polyethyleneoxide and the like, water-soluble natural polymer of plant mucilage such as Hibiscus manihot L., gluten,velvet mallow, Hydrangea paniculata sieb. and the like;

synthetic resin emulsion such as polyethylene, polypropylene, ethylene-propylenecopolymer, ethylene-vinylacetate copolymer, polyvinyl chloreide, polyvinylidene chloride, polystyrene, polyvinylacetate fluororesin, thermoplastic acrylic resin, thermoplastic polyester, thermoplastic polyamide, thermoplastic urethane, thermosetting synthetic resin such as epoxy resin, melamine resin, urea resin, phenolic resin, resorcin resin, alkylresorcin resin and the like, acrylonitrile-butadiene copolymer, styrene-butadiene copolymer, acrylonitrile-butadiene-styrene copolymer and the like;

synthetic ruber or elastomer powder, or synthetic ruber or elastomer emulsion such as acrylic rubber, butyl rubber, silicone rubber, urethane rubber,fluorinated rubber, polysulfide rubber, graft rubber, butadiene rubber, isoprene rubber, chloroprene rubber, polyisobutylene rubber, polybutene rubber, isobutene-isoprene rubber, acrylate-butandiene rubber, styrene-butandiene rubber, acrylonitrile-butadiene rubber, pyridine-butadiene rubber, styrene-isoprene rubber, acrylonitrile-chloroprene rubber, styrene-chloroprene rubber, styrene-butadiene-styrene copolymer, styrene-isoprene-styrene copolymer, styrene-hydrogen addition polyolefin-styrene copolymer, block copolymer such as butadiene-styrene block copolymer, styrene-rubber intermediate block styrene copolymer and the like may be added to said dispertion of the hot-melt adhesive powder. Furthermore, if necessary, a filler such as calcium carbonate, talc, qypsum, silica, carbon black, wood powder, walnut powder, coconuts powder, starch and the like, cellulose and celllose derivative such as carboxymethylcelllose, methylcelllose, hydroxymethylcel llose and the like, a pigment, dye, a fire retardant, a flame retardant, an insect repllent, antiseptic, an antioxidant, an UV absorber, fluoresent dye, a surface active agent, a blowing agent, a softener agent such as paraffin, wax, silicone and the like, a water repllent agent, an oil repllent agent, a release agent, a plasticizer and the like may be added to said dispersion of hot-melt adhesive powder.

In a case where said dispersion of a hot-melt adhesive powder is alkalized by said third component(s) or another alkali materials, said dispersion of a hot-melt adhesive powder is thickened by adding said alkali-thickening type thickener without adding said alkali agent.

To coat said dispersion of a hot-melt adhesive powder on a surface to be coated, it is preferable to spray said dispersion on said surface, applying high pressure. In this spray method, said dispersion can be effectively sprayed and coated even if said dispersion has a high viscosity. In this spray method, said dispersion of a hot-melt adhesive powder may be stirred or may not be stirred. The coating amount may be commonly in the range between 1 to 100 $g/m^2$.

Further, said dispersion of a hot-melt adhesive powder may be previously prepared in a high concentration. In this case, said dispersion of a hot-melt adhesive powder may be diluted by the water when said dispersion of a hot-melt adhesive powder is used.

As said dispersion of a hot-melt adhesive powder has a structural viscosity, when said dispersion of a hot-melt adhesive powder is sprayed on the surface having naps, said dispersion of a hot-melt adhesive powder does not enter into spaces between naps and is held on the surface and effectively fixed on the surface after drying. Further the sedimentation of said hot-melt adhesive powder is effectively prevented in said dispersion of a hot-melt adhesive powder, and the hot-melt adhesive powder is uniformly coated on the surface.

[Heat sensitive adhesive sheet]

Said heat sensitive adhesive sheet of the present invention is manufactured by coating said dispersion of a hot-melt adhesive powder on one side of a base sheet by spraying and drying the resulting coating layer. Said hot-melt adhesive powder is effectively fixed on the surface of said heat sensitive adhesive sheet. Further since said hot-melt adhesive powder is coated in dot, the pressure is effectively applied on said dotted coating layer of said hot-melt adhesive powder in the adhesion process and said dotted coating layer does not obstruct the gas permeability of said base sheet in a case where said base sheet has a gas permeability.

As said base sheet, for example, synthetic fiber such as polyester fiber, polyethylene fiber, polypropylene fiber, polyamide fiber, acrylic fiber, urethane fiber, polyvinyl chloride fiber, polyvinylidene chloride fiber, acetate fiber and the like, natural fiber such as pulp, cotton, wool, coconut fiber, hemp fiber, coconut fiber, bamboo fiber and the like, inorganic fiber such as glass fiber, carbon fiber, ceramics fiber, asbestos, ceramics fiber, metal fiber and the like, non-woven fabric, fabric or knitting consisting of one or more kinds of fiber such as reclaimed fiber which is produced by splitting scraps of textile products using the above fiber, foamed plastic sheet having a connected cell structure such as foamed polyurethane, foamed polyethylene, foamed polypropylene, foamed polyamide, foamed polyester, foamed polyvinyl chloride and the like can be used.

Thermoplastic synthetic resin and/or thermosetting synthetic resin is(are) impregnated into said base sheet. As thermoplastic synthetic resin, polyethylene, polypropylene, ethylene-propylene copolymer, ethylene-vinylacetate copolymer, polyvinyl chloride, polyvinylidenechloride, polystyrene, polyvinyl acetate, fluororesin, thermoplastic acrylic resin, thermoplastic polyester, thermoplastic polyamide, thermoplastic urethane, acrylonitrile-butadiene copolymer, styrene-butadiene copolymer, acrylonitrile-butadiene-styrene copolymer and the like can be used. As thermosetting synthetic resin, urethane resin, melamine resin, thermosetting acrylic resin, urea resin, phenolic resin, resorcin resin, alkylresorcin resin, epoxy resin, thermosetting polyester and the like can be used.

As above described, when said synthetic resin is impregnated in said base sheet, said synthetic resin may fill in mesh of said base sheet and as a result, the softened hot-melt adhesive coated on one side of said base sheet in dot does not penetrate on the other side of said base sheet when the pressure is applied on said base sheet in the adhesion process. For instance, when said heat sensitive adhesive sheet is used as a surface layer of an interior, no pimples by said penetration of said hot-melt adhesive are produced to give a preferable appearance of said interior. Further said synthetic resin impregnated in said base sheet gives a high rigidity to said base sheet to improve the dimensional stability of said base sheet against temperature change or humidity change.

The impregnating amount of said synthetic resin may be commonly in the range between 2 to 500 g/m$^2$. To impregnate said synthetic resin in said base sheet, said base sheet may be dipped in a solution or an emulsion of said synthetic resin or said solution or emulsion is coated on one or both sides of said base sheet by using the spray gun, the roll coater, the knife coater and the like and then dry the resulting coating layer. A blowing agent may be added in said solution or emulsion of said synthetic resin.

In a case where a thermosetting resin is impregnated in said base sheet as said synthetic resin, said thermosetting resin may be cured in said drying process.

Further, a fluoric or silicone water repellent agent, an oil repellent agent, a flame retardant, an anti-flame agent, an ultraviolet absorber and the like may be impregnated in or coated on said base sheet.

The coating amount of said dispersion of a hot-melt adhesive powder is commonly in the range between 1 to 100 g/m$^2$. In a case where said base sheet has the gas permeability, it is preferable to form a vacuum on one side of said base sheet opposite to the side on which said dispersion is coated. By forming a vacuum, the splashing of said hot-melt adhesive powder by the impact in the spray is effectively prevented and said hot-melt adhesive powder is certainly adsorbed on the surface of said base sheet.

After coating said dispersion by the spray, said base sheet may be dried by heating. The heating condition may be for 1 to 10 minutes at a temperature above the melting point of said hot-melt adhesive, commonly above 70° C. In a case where a thermosetting synthetic resin is impregnated in said base sheet, said thermosetting synthetic resin may be cured in the above described drying process.

The resulting heat sensitive adhesive sheet can be used as a surface layer of the car interior, a backing sheet of the base of the car interior, a core sheet of the clothes and the like.

[Interior]

An interior of the present invention consists of said heat sensitive adhesive sheet as a surface layer and a base of the interior on which said surface layer is attached.

In a case where said heat sensitive adhesive sheet is used as said surface layer, an artificial leather, a natural leather, a knitting, a textile goods and the like or a laminating material of said sheet and a foamed polyurethane sheet, a foamed polyethylene sheet, a foamed polypropyrene sheet, a foamed polystyrene sheet, a foamed polyvinylchloride sheet and the like may be preferably used as a base sheet.

As said base of the interior, for example, a synthetic fiber such as polyester fiber, polyethylene fiber, polypropylene fiber, polyamide fiber, aramid fiber, acrylic fiber, urethane fiber, polyvinyl chloride fiber, polyvinylidene chloride fiber, acetate fiber, rayon, cupro and the like; a wood fiber such as pulp, a chip of wood and the like; a natural fiber such as cotton, wool, silk, hemp, kenaf fiber, coconut fiber and the like; an inorganic fiber such as glass fiber, asbestos, ceramics fiber, carbon fiber, metal fiber and the like; a mixture of two or more kinds of said fiber; a fiber sheet which is a reclaimed fiber produced by splitting scraps of textile products using the above fiber and manufactured by a thermoplastic synthetic resin such as polyethylene, polypropylene, ethylene-propylene copolymer, ethylene-vinylacetate copolymer, polyvinyl chloreide, polyvinylidene chloride, polystyrene, polyvinylacetate, fluororesin, thermoplastic acrylic resin, thermoplastic polyester, thermoplastic polyamide, thermoplastic urethane, acrylonitrile-butadiene copolymer, styrene-butadiene copolymer, acrylonitrile-butadiene-styrene copolymer and the like, a thermosetting synthetic resin such as urethane resin, melamine resin, thermosetting acrylic resin, urea resin, phenolic resin, resorcin resin, alkylresorcin resin, epoxy resin, thermosetting polyester and the like, a synthetic resin precursor such as a prepolymer such as urethane resin prepolymer, epoxy resin prepolymer, melamine resin prepolymer, urea resin prepolymer, phenolic resin prepolymer, diallylphtalate prepolymer, acrylic oligomer, polyisocyanate, methacrylester monomer, diallylphtalate monomer and the like, oligomer, monomer and the like; a needle punching felt manufactured by needle punching of a card web of said fiber to entangle fibers respectively; a synthetic resin impregnated felt in which said synthetic resin and/or said synthetic resin precursor is (are) impregnated; a thermoplastic felt manufactured by needle punching and/or heat setting of a mixture of said fiber and one or more kinds of a resin having a low melting point below 200° C. such as polyethlene fiber, polypropylene fiber, polyester fiber, polyamide fiber and the like; a synthetic resin foam sheet such as polyurethane, polystyrene, polyvinyl chloride and the like; a reinforced synthetic resin foam sheet to which said fiber sheet is added as reinforcement fiber; a synthetic resin foam impregnated sheet in which said synthetic resin and/or said synthetic resin precursor is(are) impregnated; a cardboard or a used paper into which said synthetic resin or said synthetic resin precursor is impregnated; a lamineted base sheet with which two or more kinds of said fiber sheet are laminated; and the like can be used. Expanding agent may be added to said synthetic resin or said synthetic resin precursor which is used for said base of the interior. Said base of the interior is given a moldability by said synthetic resin or synthetic resin precursor used as a binder or impregnation agent.

In said base of the interior, it is desirable to impregnate a precondensate of said thermosetting synthetic resin in said porous material and further it is preferable to condensate slightly said precondensate to be at B-stage.

When said precondensate in said porous material is condensated to be at B-stage, time to cure said precondensate can be shortened resulting in a preferable moldability of said base of the interior may be given in a short hot-press time while said porous material in which said precondensate is impregnated has a long storage life. In said base of the interior, since said precondensate may be completely cured by the hot-press, a base of the interior having the excellent dimensional stability and the heat resistance can be provided.

Said precondensate of said thermosetting synthetic resin may preferably be a phenolic precondensate which is a precondensate of a monohydric phenol and/or a polyhydricphenol and said phenolic precondensate may be sulfomethylated and/or sulfimethylated.

Said porous material includes fiber material such as non-woven fabric, felt, fabric, knitting, their laminated sheet and the like; foamed plastic having a connected cell structure such as foamed polyurethane, foamed polyolefine such as foamed polyethylene, foamed polypropylene and the like, foamed polyvinyl chloride, foamed polystyrene, foamed amino resin such as foamed melamine resin, foamed urearesin and the like, foamed phenolic resin and the like; sintering material of plastic beads and the like.

To attach said surface layer to said base of the interior, said hot-melt adhesive powder on the backside of said surface layer is softened by heating and then said surface layer is put on said base of the interior to attach together. In a case where said base of the interior is molded in a desirable shape, said molding may be carried out before said surface layer is attached to said base or when said surface layer is attached to said base or after said surface layer is attached to said base.

In a case where said base contains a thermoplastic resin or a thermoplastic fiber having a low melting point, said base is first heated to soften said thermoplastic resin or said thermoplastic fiber and then said base is molded by the cold press or in a case where said surface layer has no gas permeability, the vacuum forming can be applied and in a case where said base contains a thermosetting synthetic resin, said base may be molded by the hot press.

In a case where said surface layer has gas permeability and said base is molded after said surface layer is attached on said base, the air or the gas generated from the synthetic resin contained in said base of the interior, such as formaldehyde gas in the case of a phenol resin, carbon dioxide gas or water in the case of polyisocyanate, can be smoothly discharged to the outside passing through the space between said dotted hot-melt adhesive powder such that no puncture may be produced in the resulting interior and the problem of the smell of the remaining gas is solved.

Said interior of the present invention can be provided for various uses such as the interior of the trunk room of the car, the dash board of the car, and the like. In said interior, since said hot-melt adhesive powder is dotted between said base and said surface layer, the rigidity of said hot-melt adhesive less affects the mechanical properties of said interior and as a result, the rigidity of said hot-melt adhesive less affects the molded shape of said interior or the embossing design of the surface of said interior so a sharp molded shape or a sharp embossing design of said interior can be ensured. Further where said surface layer has a gas permeability, as said dotted hot-melt adhesive layer also has gas permeability, the resulting interior has an excellent sound proof property.

[Thermoformable fiber sheet and molded fiber sheet]

Said thermoformable fiber sheet of the present invention is manufactured by spraying said dispersion of a hot-melt adhesive powder to fiber and manufacturing a sheet by using fiber and said molded fiber sheet is manufactured by molding said thermoformable fiber sheet.

Said fiber may be the same fiber used in said base sheet of said heat sensitive adhesive sheet and commonly said dispersion of a hot-melt adhesive powder is mixed in the mass of said fiber. The mixing amount of said dispersion of a hot-melt adhesive powder in said fiber may be in the range between 5 to 40% by weight. Since said dispersion of a hot-melt adhesive powder is mixed in said fiber by spraying, said dispersion of a hot-melt adhesive powder in said dispersion is easily mixed in said fiber uniformly. In a case where said dispersion of a hot-melt adhesive powder is mixed in said fiber with stirring, said dispersion of a hot-melt adhesive powder can be more uniformly mixed in said fiber. Said mass of said fiber in which said dispersion of a hot-melt adhesive powder is mixed is then formed.

Then, for instance, a card web is formed by carding said mass of said fiber and a plural number of said card webs are laminated to be a fleece. If necessary, said fleece is mechanically entangled by the needle punching and then generally said fleece is heated. Commonly, said fleece is heated in a hot air blow chamber and by said heating treatment said hot-melt adhesive powder in said fleece is softened to bond said fibers respectively.

The resulting fiber sheet may be cut in a desirable size and then said fiber sheet is heated at a temperature above the melting point of said hot-melt adhesive and after heating said fiber sheet may be molded by the cold press to manufacture a molded fiber sheet. In a case where a film having no gas permeability is laminated on said fiber sheet, said fiber sheet can be molded by the vacuum forming.

The resulting molded fiber sheet may be used as the head lining of the car, the door trim of the car, the rear parcel of the car, the interior of the trunk room of the car, the insulator of the building, the face panel of the door and the like.

In the present invention, since said dispersion of a hot-melt adhesive powder is sprayed to and mixed in said fiber, said hot-melt adhesive powder is easily mixed in said fiber uniformly such that a thermoformable fiber sheet and a molded fiber sheet having a uniform mechanical property can be provided.

[Carpet]

The carpet of the present invention consists of a base carpet and a dotted backing layer on the backside of said base carpet wherein said dotted backing layer is formed by spraying said dispersion of a hot-melt adhesive powder on the backside of said base carpet and then drying.

Many kinds of carpets may be used in the present invention such as the tufting carpet wherein the pile layer is formed by the tufting the pile yarn in the base cloth, the needle punching carpet wherein the pile layer is formed by needle punching of a fiber sheet from one side or both sides.

The carpet in the present invention, consists of a fiber such as synthetic fiber suchas polyester fiber, polyethylene fiber,polypropylene fiber, polyamide fiber, acrylic fiber, urethane fiber, polyvinyl chloride fiber, polyvinylidene chloride fiber, acetate fiber and the like, natural fiber such as pulp, cotton, silk, wool, coconut fiber, hemp fiber, kenaf fiber, bamboo fiber and the like, inorganic fiber such as glass fiber, carbon fiber, ceramics fiber, asbestos and the like, reclaimed fiber which is produced by splitting scraps of textile products using the above fiber, and the like may be used. The fiber may be used singly or as a mixture of two or more kinds of said carpet.

In the present invention, said dispersion of a hot-melt adhesive powder is sprayed on the backside of said carpet. A necessary amount of said backing layer can be more effectively formed on the backside of said base carpet by the spray coating than the roll coating, the knife coating, and the like such that in said spray coating, the raw material price can be reduced.

The coating amount of said dispersion of a hot-melt adhesive powder is usually in the range between 2 to 500 g/m$^2$ as solid. When said dispersion is coated on the backside of the carpet by spraying, it is preferable to form a vacuum on the surface of the base carpet.

Since said dispersion of the present invention has a structural viscosity, when said dispersion is sprayed, said dispersion does not enter into spaces between naps and held on the surface of said base carpet. Accordingly, after drying said coating layer of said dispersion, said hot-melt adhesive powder is effectively fixed in dot on the surface to be coated.

After said dispersion of a hot-melt adhesive powder is coated on the backside of said base carpet by spraying, said base carpet may be dried. Said drying process is preferably carried out at a temperature above the melting point of said hot-melt adhesive coated on the backside of said base carpet and usually said temperature may be 70° C. and the heating time may be 1 to 10 minutes. By said drying process, a backing layer consisting said hot-melt adhesive is formed on the backside of said base carpet.

Since said backing layer is formed in dot, the resulting carpet has an excellent gas permeability and when said carpet is used as a floor carpet of the car, said carpet has an excellent sound proof property.

In the present invention, another sheet may be laminated on said backing layer formed on the backside of said base carpet. Many kinds of sheets can be selected considering the purpose of the use of said carpet and said sheet may be such as, for example, a synthetic fiber such as polyester fiber, polyethylene fiber, polypropylene fiber, polyamide fiber, aramid fiber, acrylic fiber, urethane fiber, polyvinyl chloride fiber, polyvinylidene chloride fiber, acetate fiber, rayon, cupro and the like; a wood fiber such as pulp, a chip of wood and the like; a natural fiber such as cotton, wool, silk, hemp, kenaf fiber, coconut fiber; an inorganic fiber such as glass fiber, asbestos, ceramics fiber, carbon fiber, metal fiber and the like; a mixture of two or more kinds of said fiber; a fiber sheet which is a reclamed fiber produced by splitting scraps of textile products using the above fiber and manufactured by a thermoplastic synthetic resin such as polyethylene, polypropylene, ethylene-propylene copolymer, ethylene-vinylacetate copolymer,polyvinyl chloride,polyvinylidene chloride, polystyrene, polyvinylacetate, fluororesin, thermoplastic acrylic resin, thermoplastic polyester, thermoplastic polyamide, thermoplastic urethane, acrylonitrile-butadiene copolymer, styrene-butadiene copolymer, acrylonitrile-butadiene-styrene copolymer and the like; thermosetting synthetic resin such as urethane resin, melamine resin, thermosetting acrylic resin, urea resin, phenolic resin, resorcin resin, alkylresorcin resin, epoxy resin, thermosetting polyester and the like; a synthetic resin precursor such as a prepolymer such as urethane resin prepolymer, epoxy resin prepolymer,melam ine resin prepolymer, urea resin prepolymer, phenolic resin prepolymer, diallylphtalate prepolymer, acrylic oligomer, polyisocyanate, methacrylester monomer, diallylphtalate monomer and the like, oligomer, monomer and the like; a needle punching felt manufactured by needle punching of a card web of said fiber to entangle fibers respectively; a synthetic resin impregnated sheet in which said synthetic resin and/or said synthetic resin precursor is(are) impregnated; a thermoplastic felt manufactured by needle punching and/or heat setting of a mixture of said fiber and one or more kinds of a resin having a low melting point below 200° C. such as polyethlene fiber, polypropylene fiber, polyester fiber, polyamide fiber and the like; a synthetic resin foam sheet such as polyurethane, polystyrene, polyvinyl chloride and the like; a reinforced synthetic resin foam sheet to which said fiber sheet is added as reinforcement fiber; a synthetic resin foam impregnated sheet in which said synthetic resin and/or said synthetic resin precursor is(are) impregnated; a cardboard or a used paper into which said synthetic resin or said synthetic resin precursor is impregnated; a lamineted fiber sheet with which two or more kinds of said fiber sheet are laminated, and the like. Expanding agent may be added to said synthetic resin or said synthetic resin precursor which is used for said fiber sheet.

Said adhesion may be carried out by softening said backing layer by heating the backside of said carpet, putting another sheet on the backside of said carpet, and pressing said carpet together with said sheet.

When said carpet is used as a floor carpet of the vehicle, a silencer such as a felt, a foamed plastic sheet and the like is attached on the backside of said carpet by setting said silencer in a press mold, inserting said carpet whose backing layer is softened by heating in said press mold and pressing by said press mold. By said press molding, said carpet with said silencer is molded in a shape adapting to the shape of the floor of the vehicle and said carpet and said silencer are bonded together.

Further, there are alternating method in which the backing layer formed on the backside of said base carpet is heated to be softened, or in which said dispersion of a hot-melt adhesive powder is coated by spraying on the backside of said base carpet and immediately said silencer is put on said coating layer without drying, said base carpet is cut in a desirable size and then molded by a thermoforming. Said thermoforming may be the hot press or the vacuum forming of said heated carpet.

EXAMPLE 1

Figure 1:
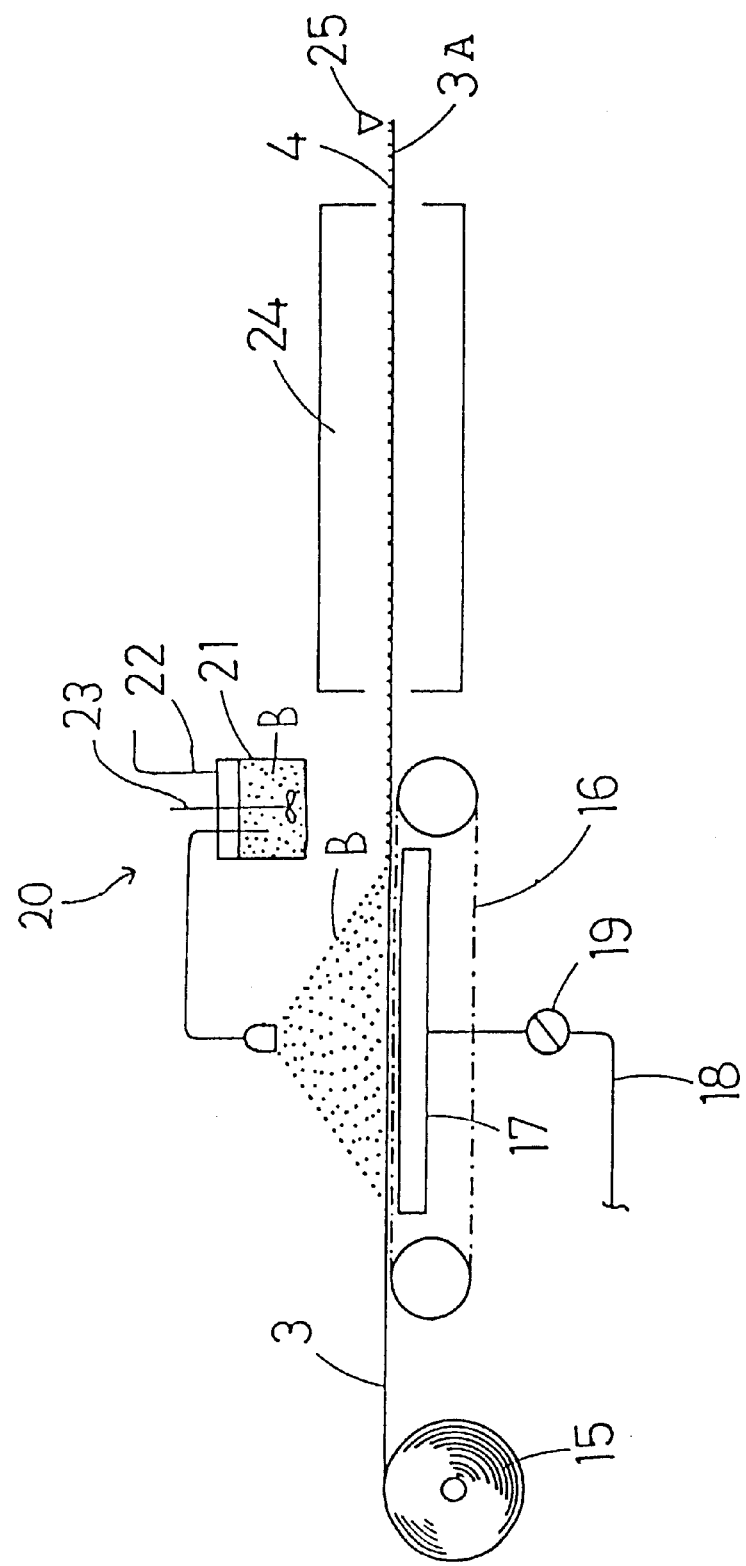
FIG. 1 is a schematic side sectional view of the manufacturing process of the heat sensitive adhesive sheet (surface layer) of an embodiment.

To prepare each dispersion sample A1 to A8 whose formulation is shown in Table 1, polyamide hot melt adhesive powder having a particle size of 250 mesh pass was dispersed in water and ethylacrylate-methacrylic acid copolymer emulsion having a solid content of 30% by weight as a thickener a or a slightly cross-linked polyacrylic acid (Junron PW110 Nihon Junyaku Co.) as a thickener b were respectively added in said dispersion by stirring to make an uniform dispersion.

Ammonia water was then added in said dispersion for thickening. The resulting dispersion samples A1 to A8 were respectively put in 200 cc glass bottles and kept for 2 months. After two months, storage stability of each sample was checked. The results are shown in Table 1.

TABLE 1

| Dispersion | A-1 | A-2 | A-3 | A-4 | A-5 | A-6 | A-7 | A-8 |
|---|---|---|---|---|---|---|---|---|
| Polyamide powder | 5 | 20 | 30 | 40 | 5 | 20 | 30 | 40 |
| Thickener a | 2.5 | 2.0 | 1.8 | 1.5 | — | — | — | — |
| Thickener b | — | — | — | — | 0.5 | 0.4 | 0.2 | 0.1 |
| Ammonia water | 2.0 | 1.8 | 1.5 | 1.0 | 2.0 | 2.0 | 1.7 | 1.5 |
| Water | 95 | 80 | 70 | 60 | 95 | 80 | 70 | 60 |
| pH | 7.9 | 7.7 | 7.5 | 7.2 | 8.2 | 8.0 | 8.0 | 7.9 |
| Viscosity (cp/25° C.) | 410 | 680 | 750 | 920 | 410 | 780 | 850 | 1040 |
| Storage stability | ○ | ⊚ | ⊚ | ⊚ | ○ | ⊚ | ⊚ | ⊚ |

⊚... no sedimentation
○... slight sedimentation

COMPARISON 1

Samples of dispersion of a hot-melt adhesive powder A9 to A12 whose formulations are shown in Table 2 respectively were prepared by the same method of EXAMPLE 1 excepting that said thickeners a, b and ammonia water were not added in each dispersion and storage stability of each sample was checked. The results of the checking of the storage stability are shown in Table 2.

TABLE 2

| Dispersion | A-9 | A-10 | A-11 | A-12 |
|---|---|---|---|---|
| Polyamide powder | 5 | 20 | 30 | 40 |
| Water | 95 | 80 | 70 | 60 |
| pH | 6.5 | 6.5 | 6.6 | 6.6 |
| Viscosity (cp/25° C.) | 120 | 350 | 600 | 780 |
| Storage stability | Sedimentation | Sedimentation | Sedimentation | Sedimentation |

TABLE 2-continued

| Dispersion | A-9 | A-10 | A-11 | A-12 |
|---|---|---|---|---|
| | 1 minute later | 2 minutes later | 4 minutes later | 5 minutes later |

COMPARISON 2

Excepting that 0.5% by weight of polysodiumacrylate aqueous solution was used instead of said thickeners a, b and ammonia water, dispersion of a hot-melt adhesive powder samples A13 to A16 whose formulations are shown in Table 3 were respectively prepared by the same method of EXAMPLE 1 to check the storage stability. The result of checking stability of each sample is shown in Table 3.

TABLE 3

| Dispersion | A-13 | A-14 | A-15 | A-16 |
|---|---|---|---|---|
| Polyamide powder | 5 | 20 | 30 | 40 |
| 0.5% polysodium-acrylate aqueous solution | 2.5 | 2.0 | 1.8 | 1.5 |
| Water | 95 | 80 | 70 | 60 |
| pH | 6.7 | 6.8 | 6.8 | 7.0 |
| Viscosity (cp/25° C.) | 400 | 650 | 820 | 1050 |
| Storage stability | Sedimentation 5 minutes later | Sedimentation 20 minutes later | Sedimentation 1 hour later | Sedimentation 2 hours later |

As shown in Table 1 to Table 3 relating EXAMPLE 1, COMPARISON 1, and COMPARISON 2, each dispersion in EXAMPLE 1 shows an excellent storage stability while each dispersion without a thickener in COMPARISON 1 shows a poor storage stability and each dispersion in COMPARISON 2 also shows a poor storage stability even polysodium acrylate was used as a thickener in this COMPARISON.

EXAMPLE 2

A dispersion of a hot-melt adhesive powder B was prepared by dispersing 15 parts by weight of an ethylene-vinyl acetate copolymer (EVA) powder having a particle size of 200 mesh pass in 85 parts by weight of the water and 0.1 part by weight of sodium dialkylsulfosuccinate as a dispersing agent and 1.5 parts by weight of n-butylmethacrylate-itaconic acid copolymer emulsion as a thickener were added in said dispersion and stirred. Further, ammonia water was added to adjust pH of said dispersion 8.0 and the viscosity of the resulting dispersion of a hot-melt adhesive powder B was 310 cp at 25° C.

Said dispersion B was kept at the room temperature and no sedimentation was produced after storage of more than 3 months to keep an excellent stability.

A dispersion of a hot-melt adhesive powder C was prepared by dispersing 15 parts by weight of EVA powder the same as said dispersion B was dispersed in 85 parts by weight of the water and 0.1 part by weight of sodium dialkylsulfosuccinate as a dispersing agent and 0.5 part by weight of a slightly cross-linked polyacrylic acid (Junron PW-150 Nihon Junyaku Co.) as a thickener were added in said dispersion and stirred. Further ammonia water was added to adjust pH of said dispersion 8.0 and the viscosity of the resulting dispersion of a hot-melt adhesive powder C was 720 cp at 25° C.

Said dispersion C was stored at the room temperature and no sedimentation was produced after storage more than 3 months to keep an excellent stability.

A heat sensitive adhesive surface layer and an interior were manufactured by using said dispersion B and C by the following process.

A needle punching non-woven fabric made of a polyester fiber (unit weight 120 g/m$^2$) was used as a base sheet of the surface layer.

As shown in FIG. 1, said base sheet 3 was pulled out from a sheet roll 15 to introduce said base sheet 3 on a belt conveyer 16 having a gas permeability consisting of a net, a felt and the like wherein a suction box 17 to which a vacuum path 18 with a valve 19 connects is attached to the backside of said belt conveyer 16 and a vacuum was formed on said base sheet 3 by said suction box 17 through said belt conveyer 16. Said dispersion of a hot-melt adhesive powder B and C were respectively sprayed from a spray apparatus 20 arranged above said belt conveyer 16 to coat said dispersion B and C on the surface of said base sheet 3 wherein said dispersion B and C were respectively filled in a spray tank 21 of said spray apparatus 20 and said dispersion B and C were respectively stirred by a stirrer 23 and pressed by the high pressure air from a pressure pipe 22 in said spray tank 21 and said dispersion B and C were respectively sprayed from said spray apparatus 20.

As above described, said dispersion B and C were respectively coated on the surface of said base sheet 3 in an amount of 5 g/m$^2$ as solid by spray. When said dispersion B, C respectively were coated on the surface of said base sheet 3 by spraying, since said base sheet 3 is sucked by said suction box 17 from the backside, said hot-melt adhesive powder in each dispersion B or C is sucked on the surface of said base sheet 3 without splashing by the impact of spraying.

Figure 2:
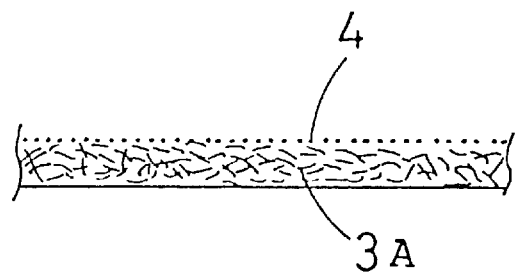
FIG. 2 is a side sectional view of the heat sensitive adhesive sheet (surface layer) of an embodiment.

After coating said dispersion B, C respectively by spraying, said base sheet 3 was introduced into a drying chamber 24 and dried at 150° C. for 2 minutes. As shown in FIG. 2, EVA powder was fixed on the surface of said base sheet which is a needle punching non-woven fabric of polyester fiber and a surface layer 3A was manufactured having a dotted adhesive layer 4 on the backside. Said surface layer 3 was cut by a cutter 25 in a desirable size.

A fiber sheet as a cushion sheet of the interior was manufactured by needle punching a mixture of a polyester fiber and a polypropylene fiber (1:1 weight ratio) to entangle said fibers together and heating to soften said polypropylene fiber to bind said fiber together.

Figure 3:
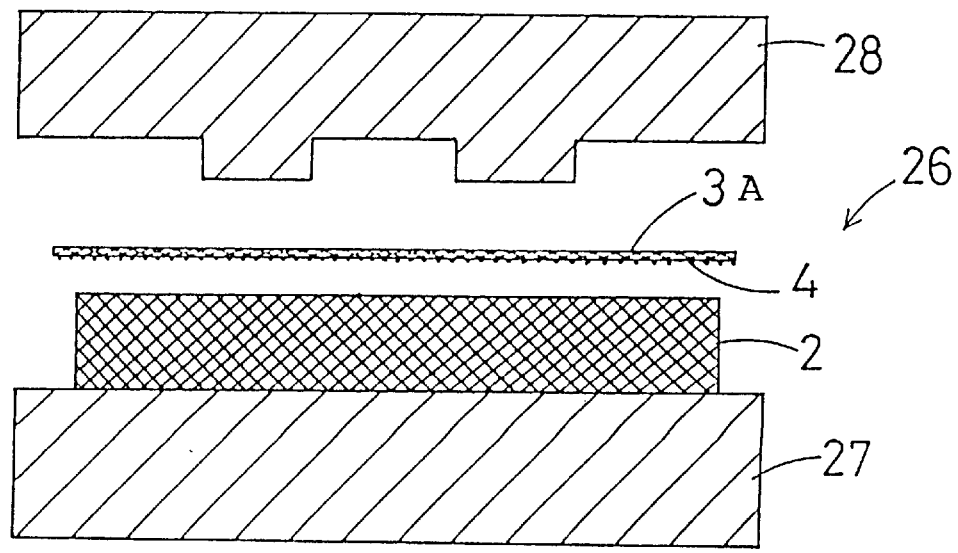
FIG. 3 is a schematic side sectional view of bonding the heat sensitive adhesive sheet (surface layer) of FIG. 2 with the base of the interior (cushion layer).

Said cushion sheet 2 was heated at 250° C. for 30 seconds to soften said polypropylene fiber and inserted in a cold press machine 26 equipped with a lower mold 27 and an upper mold 28 wherein said surface layer 3A was put on said cushion sheet 2 as shown in FIG. 3.

Said surface layer 3A and said cushion sheet 2 were pressed together by said cold press machine 26 wherein the adhesive layer 4 of said surface layer 3A was softened by said heated cushion sheet 2 such that said surface layer 3A was embossed and said surface layer 3A and said cushion sheet 2 were bonded together.

Figure 4:
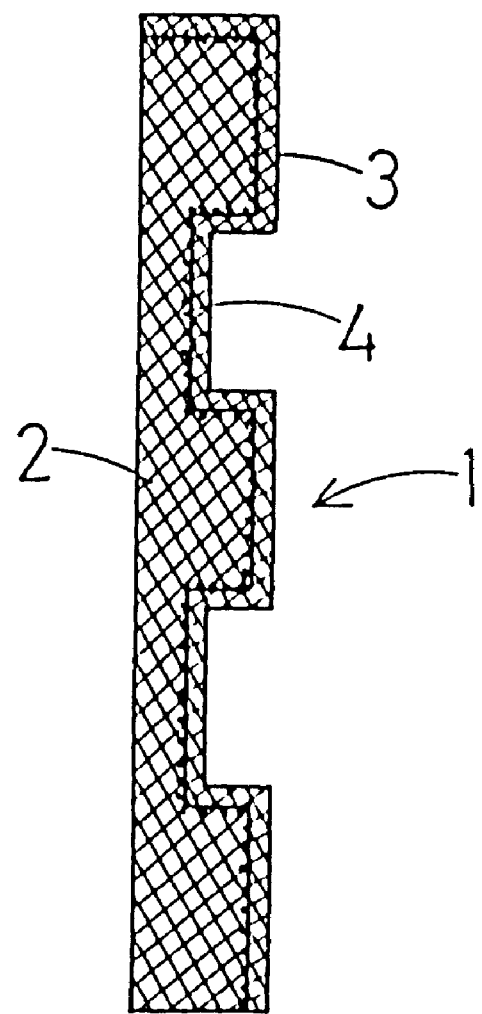
FIG. 4 is a side sectional view of the interior of an embodiment.

As above described, an interior of the trunk room 1 of the car having an embossing design on the surface shown in FIG. 4 was manufactured.

EXAMPLE 3

The surface layer manufactured in EXAMPLE 2 was put on the surface of a base of the interior made of a glass wool in which a thermosetting phenolic resin is impregnated and then thermoformed to manufacture an interior in which said surface layer and said base of the interior were strongly bonded together and said interior has a good moldability.

EXAMPLE 4

A heat sensitive adhesive sheet was manufactured by using a non-woven fabric made of a mixture of an acrylic fiber and a polyester fiber (unit weight 50 g/m$^2$) being treated with a fire retardant, a water repellent agent and an oil repellent agent and said dispersion of a hot-melt adhesive powder B and C in the amount of 10 g/m$^2$ as solid by the same method as EXAMPLE 2.

The resulting heat sensitive adhesive sheet was put on the surface of the glass wool in which a thermosetting phenolic resin is impregnated and thermoformed to manufacture an molded sheet having a good fire resisting property, water repellent, oil repellent and a good moldability in which said heat sensitive adhesive sheet and said glass wool were strongly bonded together.

EXAMPLE 5

A non-woven fabric made of a polyester fiber was dipped in a 50% by weight of aqueous solution of an alkylresorcinol resin and then said non-woven fabric was dried at 100° C. for 5 minutes to manufacture a base sheet. 20 g/m$^2$ of said alkylresorcinol resin as solid was impregnated in said base sheet.

A hot-melt adhesive sheet was manufactured by using said base sheet and said dispersion of a hot-melt adhesive powder of EXAMPLE 2 by the same method as EXAMPLE 2 excepting that said base sheet was not sucked from its backside.

A cloth without an adhesive layer was put on the surface of said hot-melt adhesive sheet on which said dispersion of a hot-melt adhesive powder B or C was coated. Said cloth and said hot-melt adhesive sheet were bonded together by pressing with an electric iron whose pressing face was heated at 140° C. After said heat pressing the surfaces of said hot-melt adhesive sheet of the resulting laminating sheet was observed and no pimples caused by the migration of said hot-melt adhesive were-recognized. After that, the 180° C. peeling test of said laminating sheet was carried out and the bonding strength of each laminating sheet was 1.2 kg/cm.

EXAMPLE 6

Scrap of a fiber sheet was difibrated to make a reclaimed fiber. Said reclaimed fiber was stirred in a mixer and the dispersion of a hot-melt adhesive powder A-2 or A-6 prepared in EXAMPLE 1 was sprayed respectively. As above described, said reclaimed fiber in which said dispersion A-2 or A-6 was respectively mixed in an amount of 15% by weight as the poloyamide powder was passed through a carding machine to make a carding web and 10 layers of said carding web was tiered to be a fleece.

The resulting fleece was pinched between a pair of iron panels heated at 220° C. for 10 minutes to soften polyamide powder in said fleece and fibers in said fleece were bonded together by said softened polyamide powder.

The resulting original sheet was cut in a desired size and after said sheet was heated at 200° C., said sheet was cold pressed at a pressure of 3 kg/cm$^2$ to manufacture a base of the head lining of the car.

EXAMPLE 7

40 parts by weight of a polyester powder having a particle size 250 mesh pass was dispersed in 60 parts by weight of water. 1 part by weight of an ethylacrylate-methacrylic acid copolymer emulsion as a thickener and 0.001 part by weight of a fluorescence dyestuff and further 2.5 parts by weight of ammonia water were added in said dispersion by stirring to prepare a dispersion of a hot-melt adhesive powder D whose viscosity was 620 cp at 25° C. and pH was 8.0.

The resulting dispersion was kept at the room temperature. Said dispersion had an excellent stability and no sedimentation was recognized after more than 4 months storage.

40 parts by weight of a polyester powder having particle size 250 mesh pass was dispersed in 60 parts by weight of water. 0.1 part by weight of a partially neutralized slightly cross-linked polyacrylic acid (Reogic 250H, Nihon Junyaku Co.) as a thickener and a 0.001 part by weight of a fluorescence dyestuff and further 1.5 parts by weight of ammonia water were added in said dispersion to prepare a dispersion of a hot-melt adhesive powder E whose viscosity was 1500 cp at 25° C. and pH was 8.0.

The resulting dispersion was kept at the room temperature. Said dispersion has an excellent stability and no sedimentation was recognized after more than 4 months storage.

Said dispersion D or E was coated on the backside of a carpet made of an acrylic fiber and a cotton fiber by spraying in an amount of 60 g/m$^2$ as solid and said coating layer was dried by heating to form a dotted backing layer. A non-wove fabric (unit weight 15 g/m$^2$) was put on said dotted backing layer of said carpet and said carpet was hot-pressed together with said non-woven fabric to manufacture a laminated carpet in which said carpet and said non-woven fabric were strongly bonded together.

UTILITY IN INDUSTRY

The dispersion of a hot-melt adhesive powder of the present invention is useful as the heat sensitive adhesive sheet, the thermoformable fiber sheet or the carpet. Said heat sensitive adhesive sheet is useful as the surface layer of the car interior, the backing layer of the base of the car interior or the core of clothes, the molded fiber sheet made of said thermoformable fiber sheet is useful as the head lining of the car, the door trim of the car, the rear parcel of the car, the trunk room interior of the car, the insulator of the building, the surface panel of the door, and said carpet is useful as the floor carpet of the car.

What is claimed is:

1. A dispersion of a hot-melt adhesive powder comprising water and a hot-melt adhesive powder which is dispersed in said water wherein an alkali-thickening type thickener is used for thickening of said dispersion.

2. A dispersion of a hot-melt adhesive powder in accordance with claim 1, wherein said alkali-thickening type thickener comprises an alkali-thickening type acrylic emulsion.

3. A dispersion of a hot-melt adhesive powder in accordance with claim 1, wherein said alkali-thickening type thickener comprises a slightly cross-linked polyacrylic acid.

4. A dispersion of a hot-melt adhesive powder in accordance with claim 1, wherein said dispersion is produced by the process comprising dispersing said hot-melt adhesive powder and adding said alkali-thickening type thickener in the water, and adding an alkali agent in said dispersion for thickening.

5. A dispersion of a hot-melt adhesive powder in accordance with claim 1, wherein said dispersion is produced by the process comprising adding an alkali-thickening type thickener to the water, adding an alkali agent to said water for thickening and dispersing a hot-melt adhesive powder in said water.

6. A dispersion of a hot-melt adhesive powder in accordance with claim 1, wherein said dispersion is produced by the process comprising dispersing a hot-melt adhesive powder and adding an alkali agent in the water, and adding an alkali-thickening type thickener to said dispersion for thickening.

7. A heat sensitive adhesive sheet manufactured by the process comprising coating by spraying said dispersion of a hot-melt adhesive powder in accordance with claim 1 on a base sheet and drying the resulting coating layer on said base sheet.

8. A heat sensitive adhesive sheet in accordance with claim 7, wherein a synthetic resin is impregnated in said base sheet.

9. A heat sensitive adhesive sheet in accordance with claim 7, wherein said base sheet has gas permeability and when said dispersion of a hot-melt adhesive powder is coated by spraying on one side of said base sheet, a vacuum is formed on the other side of said base sheet.

10. A heat sensitive adhesive sheet in accordance with claim 7, wherein said heat sensitive adhesive sheet is used as a surface layer of an interior and said heat sensitive adhesive sheet is attached to a base of said interior.

11. A thermoformable fiber sheet manufactured by the process comprising spraying and mixing said dispersion of a hot-melt adhesive powder in accordance with claim 1 to a fiber and forming a sheet by using said fiber.

12. A molded fiber sheet manufactured by molding said fiber sheet in accordance with claim 11.

13. A carpet having a backing layer dotted on the backside of said carpet wherein said backing layer is formed by spraying said dispersion of a hot-melt adhesive powder in accordance with claim 1 on the backside of said carpet and drying.

14. A carpet in accordance with claim 13, wherein another kind of sheet is attached to said backing layer.

* * * * *